United States Patent
Iseki

(10) Patent No.: US 6,439,601 B1
(45) Date of Patent: Aug. 27, 2002

(54) AIR BELT AND AIR BELT APPARATUS

(75) Inventor: Hideo Iseki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/704,617

(22) Filed: Nov. 3, 2000

(30) Foreign Application Priority Data

Nov. 5, 1999 (JP) .......................................... 11-315528

(51) Int. Cl.⁷ ............................................. B60R 21/18
(52) U.S. Cl. ..................................................... 280/733
(58) Field of Search ........................... 280/804, 801.1, 280/733, 808; 297/468, 469

(56) References Cited

U.S. PATENT DOCUMENTS

| | | | | |
|---|---|---|---|---|
| 5,385,367 A | * | 1/1995 | Tanaka et al. | 280/733 |
| 5,390,953 A | * | 2/1995 | Tanaka et al. | 280/733 |
| 5,465,999 A | * | 11/1995 | Tanaka et al. | 280/733 |
| 5,466,002 A | * | 11/1995 | Tanaka et al. | 280/733 |
| 6,217,063 B1 | * | 4/2001 | Takeuchi | 280/733 |
| 6,220,626 B1 | * | 4/2001 | Utsumi et al. | 280/733 |
| 6,244,621 B1 | * | 6/2001 | Kameyoshi et al. | 280/733 |

FOREIGN PATENT DOCUMENTS

JP     05-085301     4/1993

* cited by examiner

*Primary Examiner*—Paul N. Dickson
*Assistant Examiner*—Faye M. Fleming
(74) *Attorney, Agent, or Firm*—Foley & Lardner

(57) ABSTRACT

To provide an air belt that maintains a flat belt like state, enables passage through an anchor and direct winding to a retractor, and has satisfactory comfort. An air belt includes a bag, a tubular mesh webbing made of a fabric or a textile, and a hollow cover accommodating the mesh webbing. The mesh webbing expands and contracts flexibly in the lateral direction but resists stretching in the longitudinal direction. The hardness of the cover in the lateral direction is greater than the hardness in the longitudinal direction, and the cover bends flexibly in the longitudinal direction but resists bending in the lateral direction. The cover, which is flat and tubular, is formed by longitudinally folding a flat, long sheet along a folding line and seaming the longitudinal sides with a thread, the thread is broken when the bag is inflated.

9 Claims, 4 Drawing Sheets

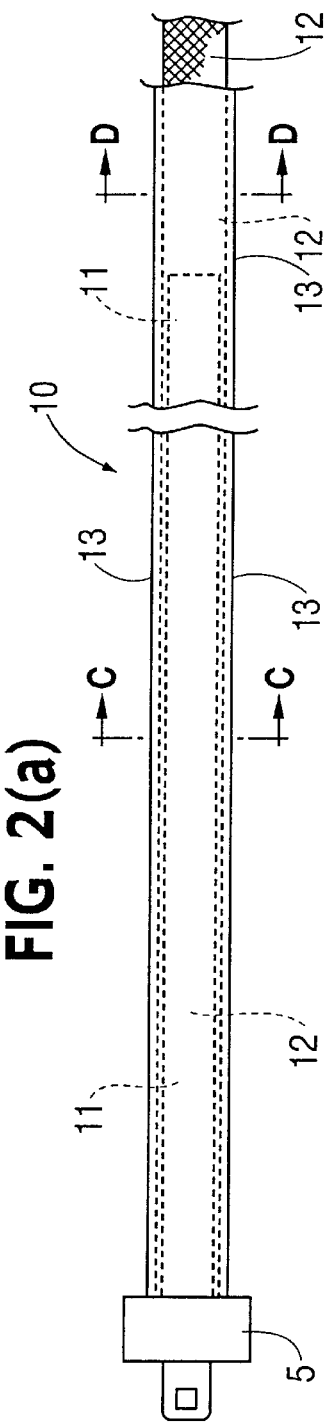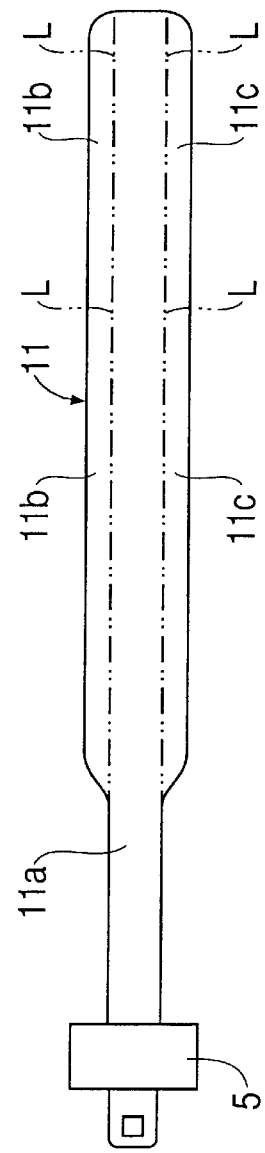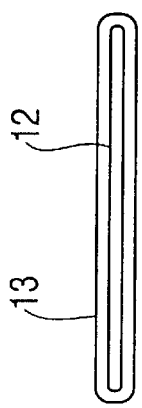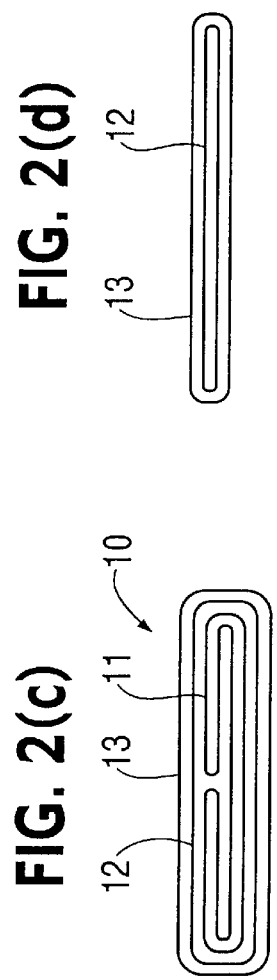
FIG. 2(a)
FIG. 2(b)
FIG. 2(c)
FIG. 2(d)

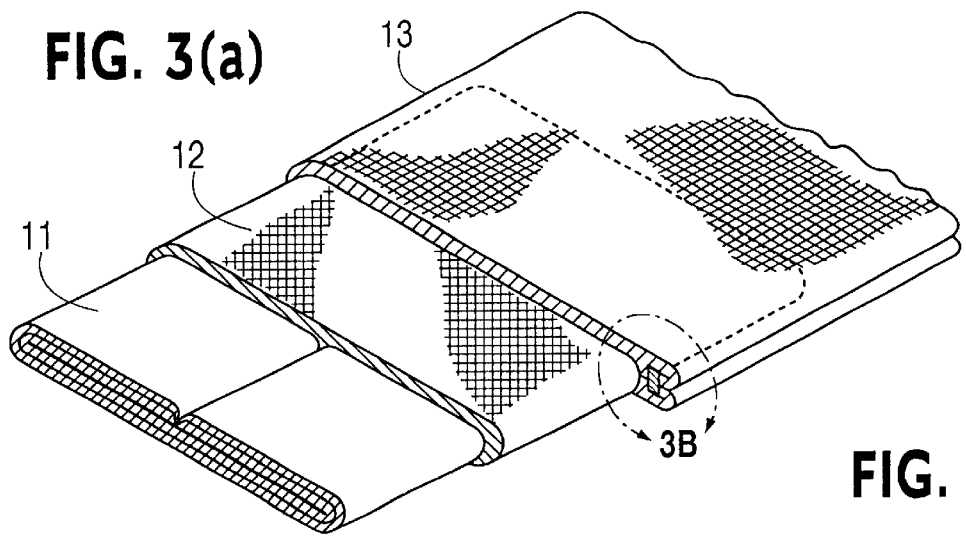
FIG. 3(a)
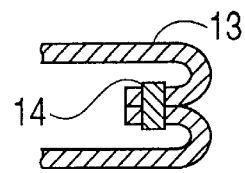
FIG. 3(b)
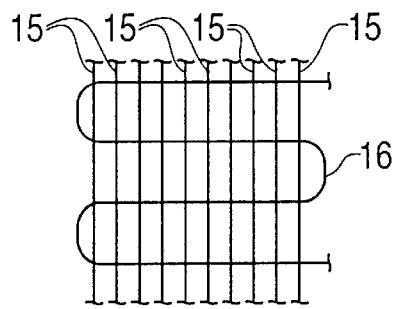
FIG. 4
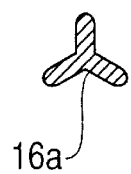 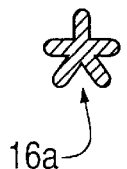 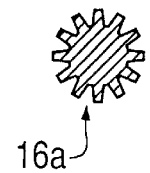
FIG.5(a)  FIG.5(b)  FIG.5(c)

AIR BELT AND AIR BELT APPARATUS

BACKGROUND OF THE INVENTION

This application is related to Japanese Patent Application No. H11-315528, filed Nov. 5, 1999, the entire disclosure of which is hereby incorporated by reference.

1. Field of the Invention

The present invention relates to an air belt apparatus for protecting passengers of moving vehicles during a collision, and, more particularly, to an air belt and an air belt apparatus inflated by gas from a gas generator.

2. Description of Prior Art

Japanese Unexamined Patent Publication No. 5-85301 describes a typical air belt apparatus. FIG. 6 is a perspective view showing the air belt of that publication. The air belt apparatus 1 includes an inflation belt 2, which extends diagonally from a right side to a left side of the passenger, a webbing 2a, which is connected to the inflation belt 2, a lap belt 3, which is extended from the right side to the left side of the passenger, a buckle device 4, which is arranged on the floor or the like of a vehicle, a tongue 5, which is engaged with the buckle device when fastening the belt, and an anchor 6, which guides the webbing 2a.

The webbing 2a is a normal belt similar to that of a typical, conventional belt and is slidably inserted through the anchor 6. One end of the webbing 2a is wound and connected to a retractor 7 (ELR) incorporating an emergency locking mechanism seat belt. The seat belt retractor 7 is fixed to the vehicle body. The inflation belt 2 is seamed and connected with the expansion belt 2, and the other end is connected with the tongue 5. The lap belt 3 is a normal belt similar to that of a normal seat belt. One end of the lap belt 3 is connected to the tongue 5 and the other end is connected to the seat belt retractor (ELR) 8, which is fixed to the vehicle body. A gas generator 9, which is activated during emergencies, such as during a collision, to generate high-pressure gas, is connected to a buckle device 4. Gas flows from the gas generator 9 to the inflation belt 2 through a passage extending between the tongue 5 and the buckle device 4. The inflation belt 2 is formed by folding a wide strip-like bag into a narrow strip and accommodating the folded bag in a cover. Under normal situations, the inflation belt 2 is held in a strip-like manner. The air belt apparatus 1 is used in the same manner as an ordinary seat belt apparatus. When the gas generator 9 is activated during collision of the vehicle, the inflation belt 2 is inflated, as shown by the broken lines, to protect the passenger.

In this typical air belt apparatus, the inflation belt 2 is connected to the webbing 2a, which is wound in the retractor 7. This is because the inflation belt 2 is thicker than the webbing 2a thereby making it difficult to pass through the anchor 6 and be wound in the retractor 7.

In this typical air belt, the inflation belt 2 is less rigid than the webbing 2a and thus difficult to be kept in a flat belt-like state. This makes the passenger uncomfortable.

In this typical air belt, the hardness in the lateral direction is low at the inflation portion. Thus, the inflation portion easily bends into an overlapped state at the shoulder anchor portion. When bending and overlapping occurs, unwinding and winding actions may not be smooth and the restraining capability during a collision may decrease. Thus, the length of the inflation portion is such that passage through the shoulder anchor portion is restricted.

In this typical air belt, the hardness of the inflation portion in the longitudinal direction hinders smooth winding and unwinding actions.

SUMMARY OF THE INVENTION

It is an object of the present invention to provide an air belt that can be passed through an anchor and wound directly to a retractor even if the webbing is omitted.

It is an object of the present invention to provide an air belt having satisfactory comfort.

It is another object of the present invention to prevent bending and overlapping in order to obtain a further satisfactory restraining capability.

It is another object of the present invention to provide an air belt that enables smooth winding and unwinding actions.

An air belt according to the present invention includes a hollow strip-like cover and a bag arranged in the cover, wherein the air belt is inflated by supplying gas into the bag, air belt being characterized in that the hardness of the cover in the lateral direction is greater than the hardness in the longitudinal direction.

The air belt of the present invention more easily maintains a flat belt-shape because the hardness of the cover in the lateral direction is greater than the hardness in the longitudinal direction. Further, since the hardness in the longitudinal direction is decreased, the air belt flexibly bends in the longitudinal direction. This enables the air belt to be inserted through an anchor and be wound directly to the retractor.

To make the hardness of the cover in the lateral greater than the longitudinal direction, at least some of the wefts of the cover are monofilaments or modified yarns. Alternatively, yarns thicker than those used as the warps may be used as the wefts.

It is preferred that the cover have a tearing portion that is torn when the bag is inflated. The tearing portion is seamed by a seaming thread that is broken when the bag is inflated.

In the air belt of the present invention, a mesh webbing is arranged between the cover and the bag. The mesh webbing accommodates the bag and inflates together with the bag when the bag is inflated. The mesh webbing protects the bag. Since the mesh webbing is inflated together with the bag, the inflation characteristics of the bag are not affected.

An air belt apparatus according to the present invention inflates the air belt with a gas generator.

BRIEF DESCRIPTION OF THE DRAWINGS

FIG. 2(a) is a plan view of an air belt; FIG. 2(b) is a plan view of the bag in a spread state; FIG. 2(c) is a cross-sectional view taken along line C—C in FIG. 2(a); and, FIG. 2(d) is a cross-sectional view taken along line D—D in FIG. 2(a).

FIG. 3 is a cross-sectional, perspective view showing an inflation portion of the air belt.

FIG. 4 is a schematic view showing the weaving structure of the cover.

FIG. 5 is a cross-sectional view showing examples of wefts.

DESCRIPTION OF THE PREFERRED EMBODIMENT

Figure 1B:
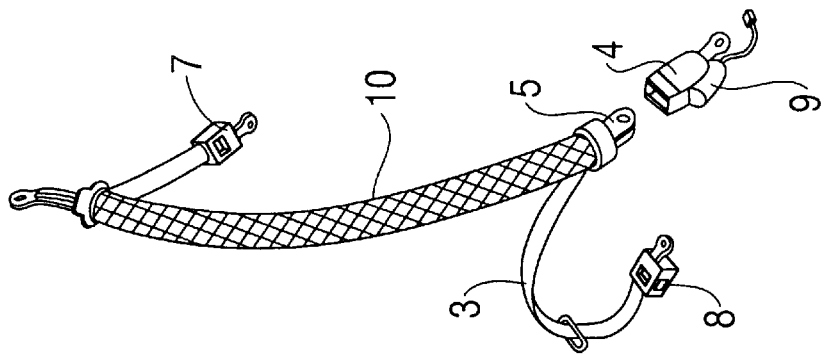
FIG. 1(a) is a perspective view showing the interior of a vehicle provided with an air belt according to an embodiment of the present invention and FIG. 1(b) is a perspective view of an air belt apparatus of according to an embodiment of the present invention.
Figure 1A:
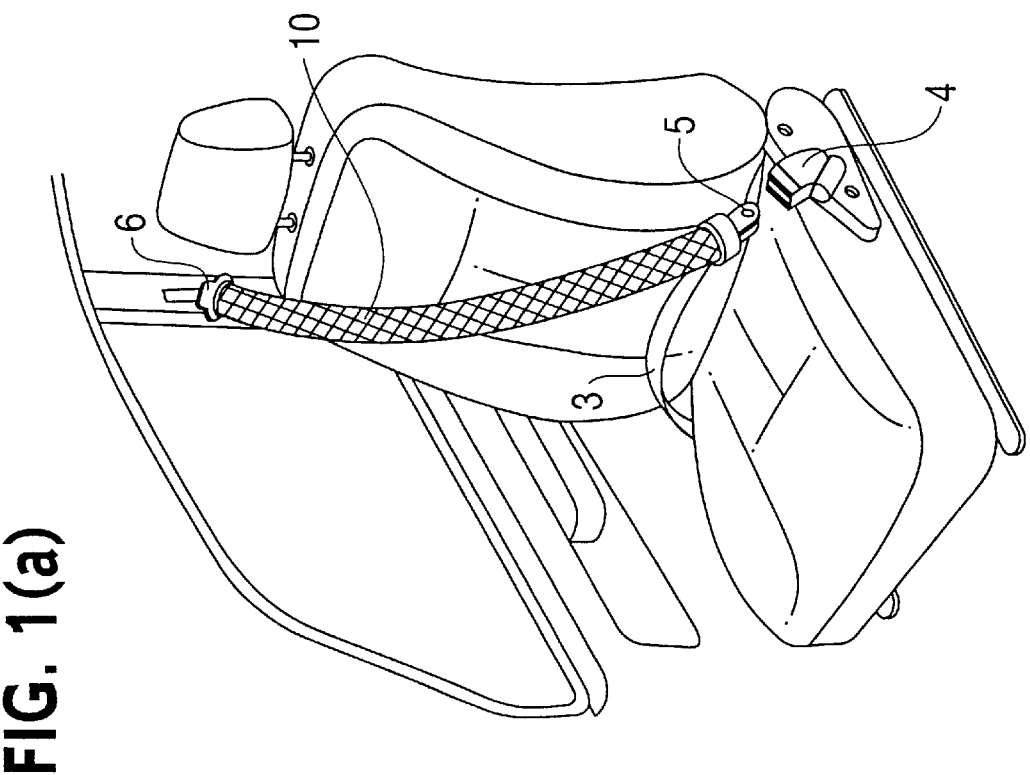

An embodiment according to the present invention will now be described with reference to the drawings.

An air belt 10 of an air belt apparatus of the present embodiment includes a bag 11, a tubular mesh webbing 12, which accommodates the bag 11 and is made of a fabric or a textile, and a hollow, strip-like cover 13. One end of the bag 11 is connected to a tongue 5 and bag 11 across extends the shoulder, chest, and stomach of a passenger sitting on a seat. The bag 11 has inflation portions 11b, 11c that are opposed toward the shoulder, chest, and hip of the passenger. The width of the portion 11a of the bag 11 closer to the tongue 5 than the inflation portions 11b, 11c, is about the same as that of the air belt 10 when the air belt 10 is not inflated. The inflation portions 11b, 11c are folded along folding lines L so that the air belt 10 is formed in a strip-like manner having a substantially uniform width.

The mesh webbing 12 flexibly expands and contracts in the lateral direction but hardly stretches in the longitudinal direction. The mesh webbing 12 undergoes heat drawing to substantially prevent stretching in the longitudinal direction (tensile direction) of the belt.

As shown in FIG. 4, the cover 13 is made of a fabric formed by warps 15, which extend in the longitudinal direction of the air belt 10, and wefts 16, which extend in the lateral direction of the air belt 10. The hardness of the cover 13 in the lateral direction is greater than that of the cover 13 in the longitudinal direction. A preferred hardness of the cover in the lateral direction is between about 0.25 to about 0.55 mN while a preferred hardness of the cover in the longitudinal direction is between about 0.1 to about 0.25 mN. These ranges were measured using the "Softmeter" method to test fabric hardness. Further, it has been found that intermediate values of lateral hardness within the preferred range are most preferred, while lower (or softer) values of longitudinal hardness within this preferred range are most preferred.

Accordingly, the cover 13 has a characteristic in which the cover 13 bends flexibly in the longitudinal direction but resists bending in the lateral direction. The cover 13, which is flat and tubular, is formed by longitudinally folding a flat, long sheet along a folding line and seaming the longitudinal sides with a thread 14. The thread strength of the thread 14 is such that it is broken when the bag 11 is inflated.

To make the longitudinal direction of the cover 13 harder than the lateral direction, for example, monofilaments may be used as the wefts 6. The rigidity of a monofilament is greater than that of a normal twisted yarn having the same denier. Thus, by using monofilaments as the wefts, the cover 13 becomes relatively harder in the lateral direction. Referring to FIGS. 5(a), 5(b) and 5(c), modified cross-section yarns 16a, 16b, 16c may be used as the wefts 16 instead of the monofilaments.

Thick yarns (yarns having a high denier) may be used as the wefts. Alternatively, during weaving, the twist of the wefts may be melted to make the wefts thicker. The cover 13 and the mesh webbing 12 extend along the entire length of the air belt. One end of the cover 13 and the mesh webbing 12 is connected to the tongue 5, and the other end is inserted through the anchor 6 and connected to the retractor 7. The mesh webbing 12 may be arranged only where the bag 11 is arranged.

As described above, the cover 13 flexibly bends in the longitudinal direction of the air belt. This enables the cover 13 to pass freely though the anchor 6 and be smoothly wound to and unwound from the retractor 7. Further, since the cover 13 is hard in the lateral direction, the entire air belt 10 maintains a flat belt form, and the cover 13 smoothly passes through the anchor 6 and is smoothly wound to the retractor. Additionally, the air belt 10 is relatively more comfortable.

Figure 6:
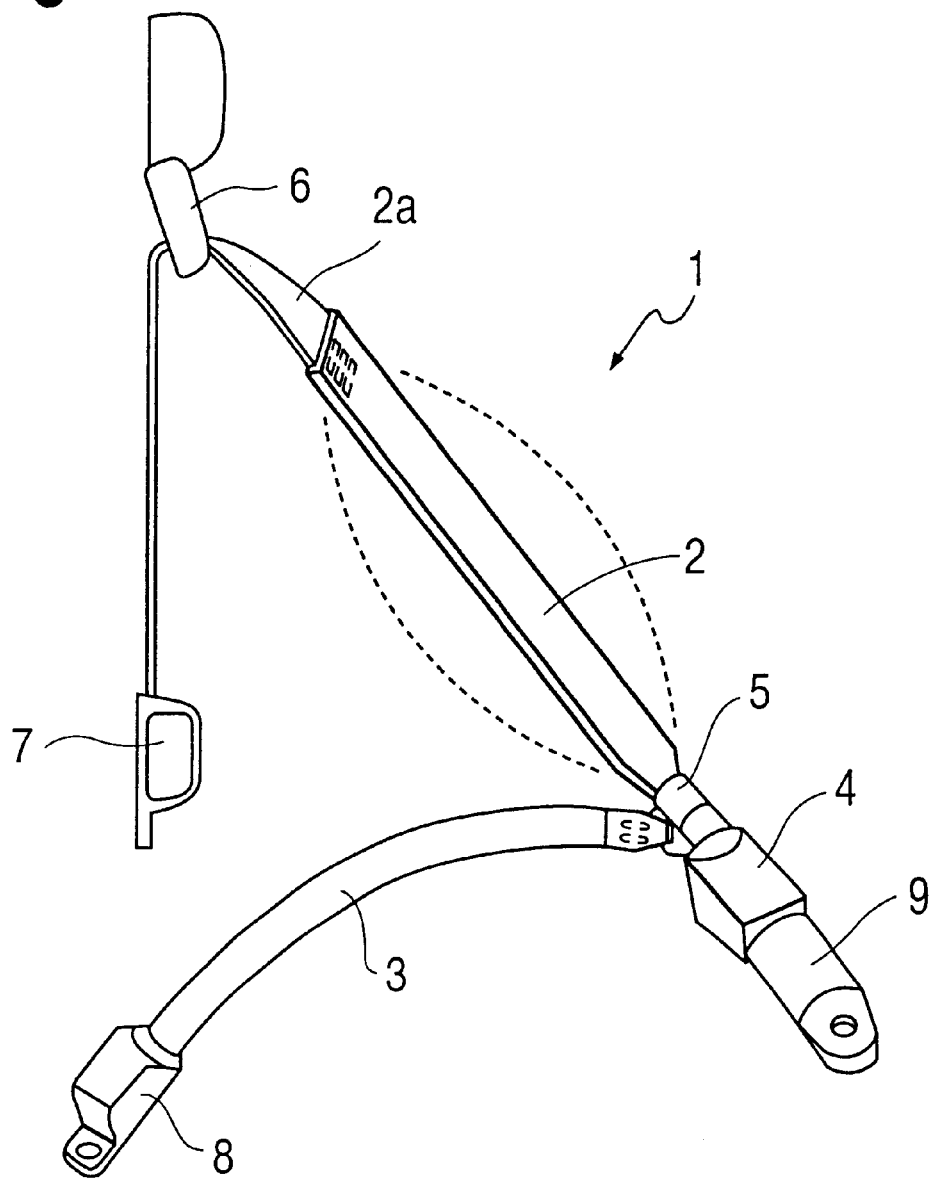
FIG. 6 is a perspective view showing a typical air belt and air belt apparatus.

The other parts of the air belt apparatus are the same as the air belt apparatus of FIG. 6, and like numerals are used for like elements. In the above air belt apparatus, the gas generator 9 is activated in a state where the tongue 5 is fastened to the buckle device 4, and then, gas is supplied into the air belt 10. Supplying the gas breaks the thread 14, tears the cover 13, and inflates the bag 11 and the mesh webbing 12. The inflation shortens the mesh webbing 12 in the longitudinal direction of the air belt 10 such that the air belt 10 is tightened on the passenger to securely protect the passenger. As described above, the mesh webbing 12 hardly stretches in the longitudinal direction due to the heat drawing treatment. The mesh of the mesh cover 12 is widened in the lateral direction when the bag 11 is inflated. This contracts the mesh cover 12 in the longitudinal direction and shortens the air belt 10.

As described above, the present invention enables the air belt to pass through the anchor and be directly wound to the retractor. Further, the present invention improves the wearing comfort of the air belt and enables the extension and retraction of the air belt to be performed smoothly. Further, the present invention obtains a satisfactory restraining capability.

While particular embodiments according to the invention have been illustrated and described above, it will be clear that the invention can take a variety of forms and embodiments within the scope of the appended claims.

I claim:

1. An air belt comprising a hollow, strip-like cover and a bag arranged in the cover, with the air belt being inflatable by supplying gas into the bag, and with the hardness of the cover in the lateral direction being greater than the hardness of the cover in the longitudinal direction.

2. The air belt of claim 1, wherein the cover has a tearing portion that is torn when the bag is inflated.

3. The air belt of claim 1, further comprising mesh webbing arranged between the cover and the bag and the mesh webbing accommodating the bag and inflating together with the bag when the bag is inflated.

4. The air belt of claim 1, wherein the cover is made of a fabric formed from warps, which extend in the longitudinal direction of the air belt, and wefts, which extend in the lateral direction of the air belt, wherein at least some of the wefts are monofilaments.

5. The air belt of claim 1, wherein the cover is made of a fabric formed from warps, which extend in the longitudinal direction of the air belt, and wefts, which extend in the lateral direction of the air belt, wherein at least some of the wefts are modified yarns.

6. The air belt of claim 1, wherein the cover is made of a fabric formed from warps, which extend in the longitudinal direction of the air belt, and wefts, which extend in the lateral direction of the air belt, wherein at least some of the wefts are thicker than the warps.

7. An air belt apparatus comprising the air belt of claim 1 and a gas generator for supplying gas into the air belt.

8. The air belt apparatus of claim 7, wherein the air belt is inserted through an anchor or a hook opening of a tongue.

9. The air belt apparatus of claim 7, further comprising:
a tongue connected to one end of the air belt; and
a retractor for winding the other end of the air belt.

* * * * *